Patented June 26, 1934

1,964,569

UNITED STATES PATENT OFFICE 1,964,569

PROCESS FOR THE PREPARATION OF CUPROUS CHLORIDE

Donald Gernes, Minneapolis, Minn.

No Drawing. Application July 18, 1932, Serial No. 623,295

10 Claims. (Cl. 23—97)

My invention relates to a process for the preparation of cuprous chloride. The cuprous chloride manufactured, heretofore, has often been contaminated with a considerable amount of cupric compounds. Furthermore, it has been prepared in the form of a fine powder which is very susceptible to atmospheric oxidation, and, therefore, very undesirable. The object of my invention is, therefore, to provide a method whereby cuprous chloride can be produced free from cupric compounds and in a form which will resist atmospheric oxidation to a great extent.

The full objects and advantages of my invention will appear in connection with the detailed description thereof, and the novel features of my inventive idea will be particularly pointed out in the claims.

My process may be divided into a number of steps.

1. The reduction of cupric chloride to cuprous chloride in hydrochloric acid solutions.
2. The concentration of the reduced solution.
3. The controlled crystallization of the cuprous chloride from the hydrochloric acid solutions.
4. The separation of the cuprous chloride crystals from the mother liquor.
5. The removal of the remaining mother liquor and any oxidation products formed while handling the crystals.
6. The drying of the crystals to aid in preventing atmospheric oxidation.

The reduction is best accomplished by gently refluxing a moderately concentrated solution of cupric chloride in 20% hydrochloride acid, in contact with an excess of finely divided copper. When the reactants are first brought together, the mixture very rapidly acquires a deep brownish-black color. As the reduction proceeds to completion, the color fades, and the solution becomes colorless when the reaction is complete. The reduction reaction probably proceeds as follows: CuCl₂+Cu=2CuCl. This reaction proceeds very rapidly at the temperature of the boiling solution, whereas at room temperature it is much slower. The fineness of the copper and the extent of the agitation caused by the convection currents in the reaction mixture or by mechanical agitation also influences the speed of the reaction.

Without the presence of the hydrochloric acid, the reaction slows down rapidly due to the copper becoming coated with the cuprous chloride which is only slightly soluble under those conditions. Cuprous chloride reacts readily with hydrochloric acid to form soluble complexes. Thus, the hydrochloric acid has two important functions.

1. It prevents the formation of cuprous chloride on the copper, thereby allowing the reaction to proceed to completion.
2. It provides a means whereby a high concentration of cuprous chloride can be obtained in the reaction mixture.

The success of my invention depends largely on the second function of the hydrochloric acid and on the much greater solubility of the cuprous chloride at the temperature of the boiling solution than at room temperature. A 20% hydrochloric acid is recommended because this concentration corresponds quite closely to the composition of the constant boiling mixture of HCl and water. Cuprous chloride would likely be more soluble in a stronger hydrochloric acid solution, but HCl gas would be evolved when boiling the solution.

The concentration of the reduced solution is accomplished by distillation. The reduced solution is decanted from the excess copper into a vessel in which it can be concentrated and later crystallized. The distillation is continued until crystal nuclei begin to form. The vapor is condensed and sent back to the reduction vessel.

It is advisable to keep copper in contact with the solution during the distillation and the crystallization, for some oxidation occurs in the handling of the solutions and while standing during the crystallization. Some coprecipitation of cupric compounds may occur in a partly oxidized solution. The copper should be in a more massive form than that used in the reduction or it would be difficult to separate it from the crystals. A stirrer having copper blades would be very desirable for this purpose.

The crystallization of the cuprous chloride must take place slowly in order to produce large crystals. The desired rate of crystallization can be readily obtained by controlling the rate of cooling. Agitation during the crystallization is advisable because the size of the crystals obtained will be more uniform.

The most of the mother liquor is removed from the crystals by filtering or centrifuging them. The remainder of the mother liquor and any oxidation products are removed by washing the crystals with a number of solutions in the order as listed below.

1. 10% hydrochloric acid.
2. Equal volumes of 10% hydrochloric acid and 95% ethyl alcohol.
3. 95% ethyl alcohol.
4. Equal volumes of 95% ethyl alcohol and ether.
5. Ether.

The 10% hydrochloric acid removes all remaining mother liquor without causing precipitation of finely divided cuprous chloride on the crystals as would occur if water were used. The finely divided cuprous chloride would be very easily oxidized.

The hydrochloric acid-alcohol solution makes it possible to remove the traces of cupric compounds without using a more dilute water solution of HCl. The alcohol then removes most of the HCl and water. The alcohol-ether solution removes still more HCl and water, so that after washing with ether, the crystals are practically free from HCl and water.

The drying of the crystals proceeds quite rapidly for the ether remaining on the crystals evaporates quickly, especially when a current of air is drawn through the crystals. The crystals must be dried thoroughly if they are to resist atmospheric oxidation.

The mother liquor from the first crop of crystals can be returned to the reduction vessel until the impurities have accumulated to such a degree that it must be discarded or purified. Sufficient copper and cupric chloride and hydrochloric acid need then be added to replace that which is removed as product or discarded.

The dried crystals have a flaky appearance and a faint lavender color, and they are not appreciably hygroscopic.

I claim:

1. The process of preparing cuprous chloride which consists in reducing cupric chloride to cuprous chloride in a boiling solution of approximately 20% hydrochloric acid in the presence of finely divided copper, allowing the cuprous chloride to crystallize slowly, separating the cuprous chloride crystals from the mother liquor, and drying the cuprous chloride crystals.

2. The process of preparing cuprous chloride which consists in reducing cupric chloride to cuprous chloride in a boiling solution of hydrochloric acid in the presence of finely divided copper, concentrating the reduced solution, allowing the cuprous chloride to crystallize slowly while agitating the same, separating the cuprous chloride crystals from the mother liquor, and drying the cuprous chloride crystals.

3. The process of preparing cuprous chloride which consists in reducing cupric chloride to cuprous chloride in a boiling solution of hydrochloric acid in the presence of finely divided copper, allowing the cuprous chloride to crystallize slowly, mechanically removing the greater part of the mother liquor from the crystals, removing the remainder of the mother liquor by washing, and drying the cuprous chloride crystals.

4. The process of preparing cuprous chloride which consists in reducing cupric chloride to cuprous chloride in a boiling solution of hydrochloric acid in the presence of finely divided copper, allowing the cuprous chloride to crystallize slowly, mechanically removing the greater part of the mother liquor from the crystals, removing the remainder of the mother liquor by successive washings with hydrochloric acid, ethyl alcohol and ether, and drying the cuprous chloride crystals.

5. The process of preparing cuprous chloride which consists in reducing cupric chloride to cuprous chloride in a boiling solution of hydrochloric acid in the presence of finely divided copper, allowing the cuprous chloride to crystallize slowly, mechanically removing the greater part of the mother liquor from the crystals, removing the remainder of the mother liquor by successive washings with the following solutions in the order given and approximately the percentages stated, 10% hydrochloric acid, equal volumes of 10% hydrochloric acid and 95% ethyl alcohol, 95% ethyl alcohol, equal volumes of 95% ethyl alcohol and ether, and ether, and drying the cuprous chloride crystals.

6. The process of preparing cuprous chloride which consists in reducing cupric chloride to cuprous chloride in a boiling solution of approximately 20% hydrochloric acid in the presence of finely divided copper, concentrating the reduced solution, allowing the cuprous chloride to crystallize slowly, separating the cuprous chloride crystals from the mother liquor, and drying the cuprous chloride crystals.

7. The process of preparing cuprous chloride which consists in reducing cupric chloride to cuprous chloride in a boiling solution of approximately 20% hydrochloric acid in the presence of finely divded copper, allowing the cuprous chloride to crystallize slowly in the presence of copper while agitating the solution, separating the cuprous chloride crystals from the mother liquor, and drying the cuprous chloride crystals.

8. The process of preparing cuprous chloride which consists in reducing cupric chloride to cuprous chloride in a boiling solution of approximately 20% hydrochloric acid in the presence of finely divided copper, allowing the cuprous chloride to crystallize slowly, mechanically removing the greater part of the mother liquor from the crystals, removing the remainder by successive washings of dilute hydrochloric acid, hydrochloric acid and ethyl alcohol, ethyl alcohol, ethyl alcohol and ether, and ether, and evaporating the ether from the crystals.

9. The process of preparing cuprous chloride which consists in reducing cupric chloride to cuprous chloride in a boiling solution of approximately 20% hydrochloric acid in the presence of finely divided copper, allowing the cuprous chloride to crystallize slowly, mechanically removing the greater part of the mother liquor from the crystals, removing the remainder by successive washings of the following liquids in the order named and having approximately the compositions as stated, 10% hydrochloric acid, equal volumes of 10% hydrochloric acid and 95% ethyl alcohol, 95% ethyl alcohol, equal volumes of 95% ethyl alcohol and ether, and ether, and evaporating the ether from the crystals.

10. The process of preparing cuprous chloride which consists in reducing cupric chloride to cuprous chloride in a boiling solution of approximately 20% hydrochloric acid in the presence of finely divided copper, concentrating the reduced solution, allowing the cuprous chloride to crystallize slowly in the presence of copper while agitating the solution, mechanically removing the greater part of the mother liquor from the crystals, removing the remainder by successive washings of the following liquids in the order named, and having approximately the compositions as stated, 10% hydrochloric acid, equal volumes of 10% hydrochloric acid and 95% ethyl alcohol, 95% ethyl alcohol, equal volumes of 95% ethyl alcohol and ether, and ether, and evaporating the ether from the crystals.

DONALD GERNES.